Figure 1:
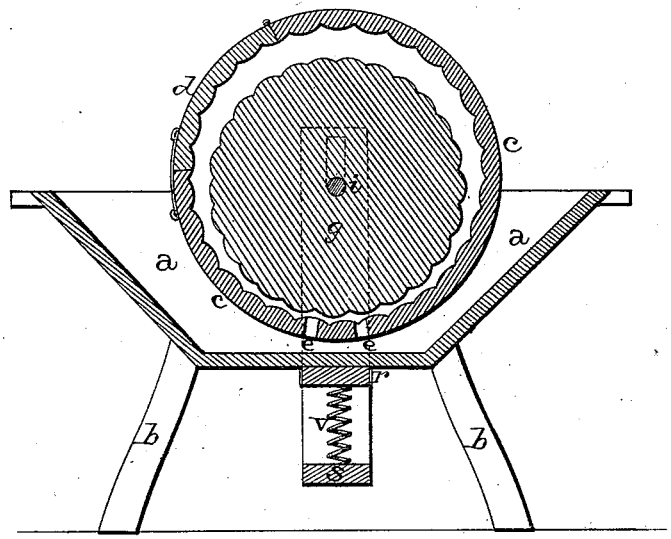
Figure 2:
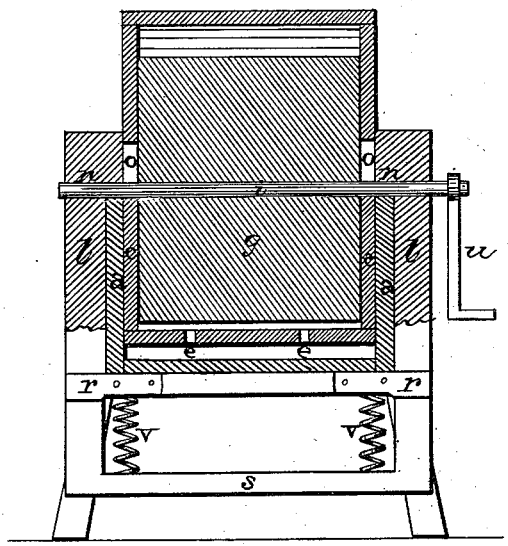

F. N. GRIFFITH.
WASHING-MACHINE.

No. 192,330. Patented June 26, 1877.

WITNESSES:
Wm Garner
Albert J. de Groff

INVENTOR:
F. N. Griffith
per
F. A. Lehmann, Atty

UNITED STATES PATENT OFFICE.

FRED. N. GRIFFITH, OF SHELL ROCK, IOWA.

IMPROVEMENT IN WASHING-MACHINES.

Specification forming part of Letters Patent No. 192,330, dated June 26, 1877; application filed April 13, 1877.

*To all whom it may concern:*

Be it known that I, F. N. GRIFFITH, of Shell Rock, in the county of Butler and State of Iowa, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in washing-machines; and it consists in the arrangement and combination of parts that will be more fully described hereinafter, whereby a simple, cheap, and effective machine is produced, in which the clothes can be thoroughly washed without being injured.

The accompanying drawings represent my invention.

$a$ represents the box or tub placed on the legs $b$. Rigidly fastened in the box $a$ is the round box $c$, which is ribbed all the way around its curved surface on the inside, so as to form a rubbing-surface for the clothes. This box is provided with the hinged door $d$, and has a series of holes, $e$, through its bottom, so that any water poured into the tub $a$ will at once rise in the box $c$, and so that the box can be thoroughly rinsed and cleaned after the washing is over. In this box $c$ is placed the round ribbed roller $g$, which is secured to the shaft $i$ that projects through the slots $o$ in each end of the box $c$, and which shaft has its bearings in the two vertically-moving uprights $l$. These uprights have the shoulders $n$ formed in their inner sides, so as to act as stops to prevent them from being forced too far downward, and they extend vertically down through the guides $r$, and have their lower ends connected together by the cross-bar $s$. These guides $r$ are mere loops of any desired construction, which encircle the sides of the uprights, so as to keep them in position. Upon the top of this cross-bar, and in between the bottom of the box $a$, are placed two or more suitable springs, $v$, which hold the uprights pressed constantly downward.

When the uprights are moved upward in any manner they carry the shaft $i$ with them, and, as this shaft rises in the slots $o$ in the ends of the box, it raises the ribbed roller $g$ with it. By turning the crank $u$, the roller is made to revolve, and, as clothes are thrown in through the door, it takes them and carries them down into the bottom of the box, and, in proportion to the thickness of the clothes, the roller rises upward. The downward pressure of the roller is just sufficient to cause the clothes to be thoroughly rubbed and cleaned without being injured.

Having thus described my invention, I claim—

1. The combination of the box $a$, box $c$ fastened therein, and provided with a slot, $o$, in each end, the roller $g$, shaft $i$, uprights $l$, guides $r$, and springs $v$, substantially as set forth.

2. The uprights $l$, having the shoulders $n$ on their inner sides, so as to catch over the top of the box $a$, guides $r$, cross-bar $s$, and springs $v$, in combination with the shaft $i$ and roller $g$, substantially as described.

In testimony that I claim the foregoing I have hereunto set my hand this 24th day of March, 1877.

FRED. NORTON GRIFFITH.

Witnesses:
  J. M. CARTER,
  H. H. MORTON.